3,519,558
SEPARATION OF SIMILAR SOLUTES USING A SEMIPERMEABLE MEMBRANE
William W. Cooper IV, Sudbury, Richard P. de Filippi, Weston, and Robert S. Timmins, Concord, Mass., assignors to Abcor, Inc., Cambridge, Mass., a corporation of Massachusetts
No Drawing. Filed Feb. 15, 1968, Ser. No. 705,636
Int. Cl. B01d 13/00
U.S. Cl. 210—23     21 Claims

ABSTRACT OF THE DISCLOSURE

Solutes of substantially the same molecular weight, size, or configuration are separated by means of semipermeable membranes, by first modifying at least one of the solutes so that the membrane will no longer pass the thus-modified solute while the unmodified material will pass through the membrane. The modification of the solute is achieved by agglomeration of the solute by, e.g., micelle formation. The process is particularly applicable to the separation of rosin acid soap and fatty acid soap from crude tall oil soap.

---

Semipermeable membranes are becoming increasingly important for the use in separating materials, for example, in the desalination of water, in the manufacture of industrial chemicals and in medical and pharmeceutical applications. The availability of membranes which are selective to particular materials, especially on the basis of molecular weight, size, or configuration, have made possible separations which have been extremely difficult, if not impossible, by conventional means. In some separations, however, the components of the solution to be separated are substantially the same or extremely close in molecular weight, size, or configuration and the membranes do not possess the ability, that is, the selectivity, to distinguish between the minor differences in the permeation characteristics of the materials to be separated. Consequently, the materials will either not pass through the membrane at all, or all components of a mixture will pass the membrane and thus, the separation, if any, is extremely inefficient or uneconomic.

A novel, efficient method for the separation of materials of substantially the same or extremely similar molecular weight, size, or configuration by means of semipermeable membranes has now been found. The novel process of the present invention comprises modifying at least one component, e.g. solute, of a solution to be separated so that it will not pass through the membrane, e.g. by agglomerating the component. The membrane will freely pass the non-agglomerated material while retaining the larger agglomerate. Thus, by means of the present invention, a conventional membrane material in the form of a sheet, tube, or capillary, can be used to separate materials which it could not otherwise distinguish.

By means of the present invention, materials of substantially the same molecular weight, size, or configuration can be readily separated in a semipermeable membrane system. A separation of two components of similar molecular weights in a fluid would require a membrane with an extremely sharp cutoff to discriminate between the two different components of extremely similar permeation characteristics. If the materials to be separated have the same permeation characteristics, i.e. the same molecular weight, size or configuration, then it is virtually impossible to separate these materials.

In the present invention the solution is pretreated so that at least one of the components is modified to decrease its permeability to a very low value and in some cases, to zero. The thus-modified material would then be introduced to the feed zone of a semipermeable membrane separation unit and substantially all the modified component of the solution would be retained in the feed zone while the un-modified material would permeate the membrane. Thus, a membrane which would normally pass all components of a solution equally well has now become a barrier to the modified component.

The modification of the solute may be carried out by any method which will alter the permeation characteristics of a material to a sufficient degree to substantially prevent its passage through a membrane which would normally permit its passage. The selectivity of semipermeable membranes is generally dependent upon the molecular weight, size, or configuration of the particular solute. Therefore, the preferred method of modifying the solute is by molecular association or agglomeration, i.e., enlarging the molecular size of one permeating species sufficiently to decrease its permeability to a very low value. A number of chemical and physical methods are known for agglomerating materials and include the combining of two or more of the individual molecules to form a larger molecule; alteration of the solubility characteristics of the solute; combining of the solute with another material to create a material impermeable to the membrane or altering the molecular configuration with respect to a given membrane to decrease its permeability.

The term "agglomeration" as used herein is intended to include all methods both physical and chemical, of modifying the solute to diminish or entirely prevent its ability to pass through the membrane, and includes the modification of the molecular weight, size, or configuration by, for example, chelation, aggregation, coagulation, flocculation, and micelle formation, so that the particular material or solute becomes substantially impermeable to a membrane which would otherwise pass said material or solute in its unagglomerated state. Such modification is also achieved by pH, temperature, or ionic strength control of the solution.

In a particularly preferred embodiment, one of the solutes of interest is capable of forming micelles. Such micelles generally consist of a group of 20 to 100 solute molecules and thus are considerably larger than the individual solute molecules. If such micelle formation does not occur spontaneously, it may be promoted by appropriately changing the solution pH, temperature, ionic strength and/or concentration. By selecting a membrane of the proper structure and selectivity, the non-micelle forming component or components will pass through the membrane along with the solvent leaving a concentrated solution of the micelle-forming component behind. Free molecules of the micelle-forming solute may pass through the membrane with the non-micelle forming solute at the critical micelle concentration. However, the free-molecule concentration of the micelle-forming solute is relatively low; thus, little, if any, of such material passes through the membrane. As long as the concentration of the micelle forming solute is over the critical micelle concentration extremely efficient separation of materials is accomplished.

The foregoing description has been primarily directed to two-component systems for ease of illustration. However, it should be understood that the solution to be separated may be composed of a plurality of components. For example, in a three component solution, one of the components may be agglomerated by the formation of micelles and retained by the membrane while the other two components pass through the membrane. Subsequently, agglomeration of one of the remaining components could be accomplished to provide a series of membrane separation cells permitting the separation of a multiple component solution.

The novel process of the present invention is particularly useful in separating the rosin acid and fatty acid soaps from tall oil soap. Crude tall oil is a by-product of sulfate pulping operations. Tall oil is a complex mixture consisting primarily of rosin and fatty acids, which separately have a value approximately three times that of the crude tall oil. However, at present the only commercially feasible method of separating these two components of tall oil is by a distillation process. The distillation operation is economical only if the amount of tall oil processed is extremely large. The process is very inefficient in that large amounts of the feed material are lost through thermal degradation.

The employment of membranes for separating the components of tall oil has heretofore not been feasible since the two principle components of tall oil possess substantially the same molecular weight. Therefore, the presently available membranes do not possess the high degree of selectivity necessary to distinguish between the rosin acid and the fatty acid. By means of the present invention, a method has been found for efficiently separating the rosin acid and fatty acid from crude tall oil.

The following non-limiting example illustrates the separation of rosin acid and fatty acid from crude tall oil by the process of the present invention.

EXAMPLE

Crude tall oil soap from a sulfate pulping operation was treated by washing with a sodium chloride solution or a sodium hydroxide solution to remove the black liquor from the mixture. The thus-washed tall oil soap was then diluted with water to a concentration of 5%. The concentration of fatty acid soap is above its critical micelle concentration. The solution was then fed to the feed zone of an ultrafiltration cell. The membrane employed in the ultrafiltration device was a cellulose acetate membrane having a selectivity such that the rosin acid soap would permeate the membrane while the fatty acid soap could not pass through the membrane. The pressure employed on the feed zone was 100 p.s.i.g. and the initial charge to the feed zone of tall oil soap solution was 1500 cc. The following table summarizes the operation of the novel process of the present invention in the separation of the components of tall oil.

fatty acid soap while the permeate zone would be rich in rosin acid soap. The residue rich in fatty acid soap is then acidified, and the fatty acids are recovered, generally in a purity of about 95%. It will be readily noted that any number of ultrafiltration units can be employed with membranes of varying degrees of selectivity to provide the desired degree of purity of the products as well as flux rates.

The separation of oleic and linoleic acids was also achieved by the novel process of the present invention. Crude tall oil soap was washed with sodium chloride solution to remove the black liquor. The thus-washed solution is then diluted with water to form a 5% solution. At this concentration, oleic acid soap forms micelles. The solution was then fed to an ultrafiltration unit which had a membrane which would pass linoleic acid soap but would not pass the oleic acid soap. The Selectivity Factor for the process was 3.23. The acids were recovered by acidification.

The membranes employed in the present invention are conventional and are selected with reference to the materials to be separated. Thus, the membrane selected is generally one which will permit the un-agglomerated material to permeate the membrane but will minimize or prevent the passage of the modified material. Since the modified material is generally at least twenty times as large as the un-modified material, the selectivity requirements of the membrane are not critical. By means of the present invention the separation process is changed from an extremely narrow band separation which requires a membrane of high selectivity to essentially a gross separation; that is, a separation of materials of relatively large differences with respect to permeation. Therefore, the membrane requirements are substantially less stringent than heretofore have been required for the separation of materials very close in permeation characteristics. It is preferred that the components to be agglomerated will be enlarged twenty to a hundred times their original size. However, it is not critical that such a degree of enlargement be accomplished, since significant improvements in selectivity can be realized without significant changes in molecular size or configuration. With the decreased discriminative property required, membranes of higher fluxes and lower selectivity can be used.

While the invention has been described primarily in terms of agglomerating one of the components of the

| Time (hrs.) | Feed concentration (gms./liter) | | | Permeate conc. of soap (gms./liter) | | | Rosin & fatty acid soap flux rate, lb./hr. sq. ft. | Selectivity factor |
| --- | --- | --- | --- | --- | --- | --- | --- | --- |
| | Rosin soap | Fatty soap | Rosin/fatty soap ratio | Rosin | Fatty | Rosin/fatty ratio | | |
| 0.0 | 25.1 | 21.4 | 1.17 | | | | | |
| 0.65 | 23.1 | 23.4 | 0.987 | 2.17 | 0.0810 | 26.8 | 0.0310 | 27.1 |
| 1.32 | 29.2 | 27.4 | 1.07 | 0.955 | 0.0499 | 19.1 | 0.0142 | 17.8 |
| 2.77 | 31.3 | 30.5 | 1.03 | 1.94 | 0.0862 | 22.7 | 0.0257 | 22.0 |

The term "Selectivity Factor" is the ratio of the rosin/fatty soap ratio in the permeate to the rosin/fatty soap ratio in the feed zone.

The purity of the rosin acid soap in the permeate zone was approximately 95%.

A commercial process for separating rosin acid soaps and fatty acid soaps may be carried out as follows. Crude tall oil soap from sulfate pulping operations is washed, e.g., with a sodium sulfate solution and then passed into a dissolving vessel where water is added to form a solution, preferably 5%; and wherein the fatty acid soap is above the critical micelle concentrations. The unsaponifiable material is then removed, e.g. by solvent extraction. The feed material is then pumped to a hold tank. If a series of ultrafiltration units are employed, the concentrated residue solution from a previous ultrafiltration device would also be added to this hold tank. The material is then fed from the hold tank to the feed zone of an ultrafiltration device under pressure. The residue stream in this ultrafiltration device would be enriched in solution, it should be understood that the separation of materials of extremely close permeation characteristics can be achieved by substantially increasing the permeability of one or more of the components. For example, peptization is employed to reduce the size of one component in a solution to permit it to permeate a membrane which normally would not permit its passage. The thus-modified material would then be introduced to the feed zone of a semi-permeable membrane unit and the modified component of the solution would permeate the membrane while substantially all unmodified material would be retained in the feed zone.

As mentioned above, the membrane material may be prepared from any suitable film-forming polymeric material known to the art such as cellulose esters, cellulose ethers, denitrofied nitrocellulose, phenol-aldehyde, urea aldehyde, acrylics, polyamides, polyolefins, silicone rubbers, polystyrenes and other elastomers and the like. A particularly preferred class of materials are the cellulose esters, more preferably cellulose acetate and polyion complex resins, e.g. sulfonated polystyrene.

Other examples of membrane materials suitable for use in the present invention are those described in U.S. Pats. Nos. 3,228,876, and 3,228,877 and in "Desalination Membranes from Organic Casting Solutions," I&EC Product Research and Development, vol. 6, page 23, March 1967.

The process of the present invention is carried out with membranes either in sheet form or in tubular form.

What is claimed is:

1. In a process for separating solute molecules from a solution which solution contains first and second individual solute molecules of substantially similar permeation characteristics by means of a membrane unit comprising a feed zone and a permeate zone separated by a semipermeable membrane the improvement which comprises:
   (a) providing a solution containing said first and second individual solute molecules, the first solute molecules capable of forming micelle formations;
   (b) adjusting the solvent of the solution to provide a concentration of the first solute molecules of or in excess of the critical micelle concentration of the first solute molecules;
   (c) forming micelle formations consisting essentially of the first solute molecules whereby the micelle formations have reduced permeating characteristics compared to the second solute molecules; and
   (d) separating the first solute molecules from the second solute molecules by introducing the solution into the feed zone and withdrawing from the permeate zone a solution rich in second solute molecules.

2. The process as defined in claim 1 wherein the separation is carried out in an ultrafiltration device and pressure is applied to the feed zone containing said solution.

3. The process as defined in claim 1 wherein a plurality of membrane units are employed in sequence and wherein the permeate from each membrane unit is fed to the feed zone of the subsequent membrane unit.

4. The process as defined in claim 1 wherein a plurality of membrane units are employed in sequence and wherein the residue in the feed zone of each membrane unit is fed to the feed zone of the previous membrane unit.

5. The process as defined in claim 4 wherein the micelle formations contain from about twenty (20) to about one hundred (100) first solute molecules.

6. The process as defined in claim 5 wherein the solution is an aqueous solution containing a first fatty acid solute and a second rosin acid solute.

7. The process for separating rosin acid soap and fatty acid soap from a mixture of said soaps which comprises adding water to said mixture to form a solution to provide a concentration of said fatty acid soap in excess of the critical micelle concentration, flowing said solution to the feed zone of a semipermeable membrane unit, said membrane selected to permit permeation of said rosin acid soap but not of the modified fatty acid soap, and collecting the permeate which is rich in rosin acid soap.

8. The process as defined in claim 7 wherein said permeate is fed to the feed zone of a second semipermeable membrane.

9. The process as defined in claim 7 wherein the residue in the feed zone is fed to the feed zone of a second semipermeable membrane.

10. The process as defined in claim 7 wherein the permeate and the residue are separately collected and acidified to provide the rosin and the fatty acid, respectively.

11. The process as defined in claim 7 wherein a plurality of membrane units are employed in sequence and wherein the permeate from each membrane unit is fed to the feed zone of a subsequent membrane unit.

12. The process as defined in claim 7 wherein a plurality of membrane units are employed in sequence and wherein the residue in the feed zone of each membrane unit is fed to the feed zone of the subsequent membrane unit.

13. The process as defined in claim 7 wherein said mixture is crude tall oil soap from sulfate pulping operations.

14. The process as defined in claim 13 wherein said tall oil soaps are treated to remove black liquor prior to forming a solution.

15. The process as defined in claim 7 wherein unsaponifiable matter is removed from said solution.

16. The process as defined in claim 15 wherein said unsaponifiable matter is removed by solvent extraction.

17. The process as defined in claim 7 wherein pressure is applied to the solution in said feed zone.

18. The process as defined in claim 17 wherein said pressure is 100 p.s.i.g.

19. The process for separating fatty acid soaps from a mixture of said soaps which comprise forming a solution of said soaps in excess of the critical micelle concentration of at least one of said fatty acid soaps, flowing said solution to the feed zone of a semipermeable membrane unit, said membrane selected to permit permeation of said un-modified fatty acid soaps but not the thus-formed micelles, and collecting the permeate.

20. The process as defined in claim 19 wherein said fatty acid soaps include linoleic acid soap and oleic acid soap and the concentration of said solution is in excess of the critical micelle concentration of oleic acid soap.

21. The process as defined in claim 19 wherein said fatty acids in the permeate and feed zone are recovered by acidification.

References Cited

UNITED STATES PATENTS

| | | | |
|---|---|---|---|
| 2,864,506 | 12/1958 | Hiskey | 210—321 |
| 3,148,141 | 8/1964 | Schohenberger et al. | 210—23 X |
| 3,398,088 | 8/1968 | Okey | 210—23 X |

FOREIGN PATENTS 548,246  11/1957  Canada.

OTHER REFERENCES

Dickey, "Filtration," published by Reinhold Publishing Corp., New York, 353 pages, received by Patent Office Oct. 19, 1961, pp. 176–186 relied on.

REUBEN FRIEDMAN, Primary Examiner

F. A. SPEAR, Jr., Assistant Examiner

U.S. Cl. X.R.

210—70